United States Patent [19]

Robinson et al.

[11] Patent Number: 5,326,150
[45] Date of Patent: * Jul. 5, 1994

[54] UPHOLSTERY FABRIC

[75] Inventors: Frank Robinson; Gerald F. Day, both of Derbyshire; Keith Jeffcoat, Warwickshire, all of United Kingdom

[73] Assignee: General Motors Corporation, Detroit, Mich.

[*] Notice: The portion of the term of this patent subsequent to May 3, 2011 has been disclaimed.

[21] Appl. No.: 767,219

[22] Filed: Sep. 30, 1991

Related U.S. Application Data

[63] Continuation-in-part of Ser. No. 412,173, Sep. 25, 1989.

[30] Foreign Application Priority Data

Sep. 22, 1988 [GB] United Kingdom ............. 8822638

[51] Int. Cl.⁵ .................................... A47C 27/00
[52] U.S. Cl. ..................... 297/218; 297/229
[58] Field of Search ............ 297/218, 228, 226, 229, 297/219.1, 228.1, 228.11

[56] References Cited

U.S. PATENT DOCUMENTS

| 2,844,192 | 7/1958 | Marquez | 297/218 |
| 2,877,832 | 3/1959 | Reavis | 297/229 X |
| 2,904,103 | 9/1959 | Nail | 297/229 X |
| 4,557,522 | 12/1985 | Isikawa | 297/218 X |

FOREIGN PATENT DOCUMENTS

| 668983 | 8/1965 | Belgium | 297/229 |
| 1293661 | 4/1962 | France | 297/229 |
| 2399223 | 4/1979 | France | 297/229 |

Primary Examiner—Jose V. Chen
Attorney, Agent, or Firm—Davis Hoxie Faithfull & Hapgood

[57] ABSTRACT

A piece of upholstery fabric for covering three-dimensional supports such as vehicle seat bases and seat backs is machine-knitted, preferably in a mainly double jersey structure, with integral tubular portions. These serve as anchorage devices for securing the fabric piece to the support which it is to cover using rods or tapes which are threaded through the tubular portions. The tubular portions may be located at the margins of the fabric piece and also at intermediate positions where the fabric piece needs to be held down, for example in a depression in the support. They may project from a surface of the fabric piece and may be like loops or they may be in the form of tubular hems or a tube lying between front and rear faces of a double jersey structure.

14 Claims, 4 Drawing Sheets

UPHOLSTERY FABRIC

This application is a continuation-in-part of application Ser. No. 412,173 filed Sep. 25, 1989.

FIELD OF THE INVENTION

This invention relates to upholstery fabric intended to cover at least part of the surface of a three-dimensional support, for example a cushion of a vehicle seat, especially an automobile seat.

BACKGROUND OF THE INVENTION

The usual method of manufacturing a vehicle seat cover involves cutting out shaped pieces of woven fabric intended to make the seat cover and subsequently sewing these pieces together to form the base and back covers, fashioning lines being introduced in some areas of the fabric if necessary. It is also necessary to provide anchorage devices at the edges of the base and back covers to enable attachment of the covers to respective cushions. Usually these anchorage devices take the form of hollow sewn hems through which a retaining member such as a metal rod or a tape can be threaded for securing the cover to the seat frame. An example of this type of arrangement is shown in U.S. Pat. No. 2,811,199.

If the base and/or back cushions comprise bolsters, it is also necessary to provide anchorage devices, usually in the form of open looped flaps, on the undersurface of the cover, in order to conform the cover to the shape of the upper surface of the cushion. U.S. Pat. No. 2,801,682 shows a loop of fabric formed by a sewing operation on the undersurface of a fabric cover for a vehicle seat. This fabric loop provides an attachment point for tensioning tapes which pass through the seat upholstery and pull the fabric loop down into the upholstery to define an indented bolster line.

The conventional manufacture of vehicle seat covers from woven fabric using cut and sew techniques both for shaping the cover and providing anchorage devices is labour-intensive, time-consuming and therefore very costly. It is also wasteful in fabric usage.

The stretch properties of knitted fabric have been employed in furniture upholstery to provide stretch covers which, for a basic shape of chair or sofa, can accommodate variations in size and shape of the customer's furniture. Belgian Patent No. 668,983 describes such stretch covers which are formed using sewing techniques both for shaping purposes and for providing sewn hems at the cover edges through which a tie cord can be threaded. Stretch covers of this type, knitted in highly stretchable single jersey fabric, are unsuitable for vehicle seat upholstery because they do not approach the standards in appearance or performance expected of conventional woven fabric covers, in particular being susceptible to distortion and bagging in use.

Recently, it has been found possible to knit one-piece upholstery fabrics which, without the need for sewing portions together, have the desired shapes to serve as covers for the base and back cushions of a vehicle seat. An aim of the present invention is to provide such a piece of knitted upholstery fabric in a form which facilitates its attachment to a three-dimensional support, such as a vehicle seat cushion.

Knitted fabric is characterized by intermeshing loops of yarn. Intermeshing of loops occurs along the wales of knitted fabric from course to course and also along the courses from wale to wale and creates integrity of the structure in both directions.

SUMMARY OF THE INVENTION

According to one aspect of the invention a piece of machine-knitted upholstery fabric for covering at least part of a surface of a three-dimensional support comprises a main portion comprising a knitted sequence of intermeshed loops of yarn and one or more tubular fabric portions integral with the main portion at location(s) where each such tubular fabric portion can serve as an anchorage device for facilitating the securing of the upholstery fabric piece to said support, each such tubular fabric portion comprising a knitted sequence of intermeshed loops of yarn of which loops of yarn at each end of the sequence intermesh with loops of yarn comprising the main portion whereby the main and tubular portions comprise an integral knitted structure. The knitted structure of each tubular fabric portion is integral with the knitted structure of the main portion of the fabric piece by virtue of the intermeshed loops of yarn produced by the knitting process. This integrity is achieved directly in the knitting process so that the tubular fabric portions are already defined on completion of knitting and there is no need for any later hemming or other sewing operation for that purpose.

It is possible to knit a tubular fabric portion using yarn which is different from the yarn used to knit the main portion of the upholstery fabric piece using an additional yarn feed and carrier on the knitting machine. However, this is not necessary for most purposes and it is preferred that a tubular fabric portion and the main portion both comprise the same yarn. In the integral knitted structure described, this results in the intermeshing loops from respectively the main portion of the upholstery fabric piece and each end of the knitted sequence of intermeshed loops which comprises a tubular fabric portion being comprised of the same yarn.

Location of a tubular fabric portion at or close to one or more margins of the fabric piece is convenient for anchorage purposes. For example, a tubular portion may be integrally knitted along one or more margins of the fabric piece.

One or more tubular fabric portions may also be located intermediate the margins of the fabric piece if intermediate anchorage is required. This may be necessary, for example, where the three-dimensional support has a well defined change in shape, particularly if concave, to which it is desired that an upholstery fabric cover should conform. Intermediate anchorage may also be desirable just to maintain location of the cover fabric on the support against distorting forces encountered in use. This is particularly important where the cover fabric has a pattern which needs to remain in a desired position relative to the areas or margins of the support being covered.

The support may be, for example, a vehicle seat base or seat back so that the piece of upholstery fabric according to the invention comprises a cover for the seat base or the seat back.

The provision of integrally-knitted tubular portions which can serve as anchorage devices for the piece of upholstery fabric gives a number of important advantages. It allows the provision of an upholstery fabric piece, for example a vehicle seat cover, which is in a finished state without the need for any hemming or sewing operations. A vehicle seat cover made according to the invention can have retaining members, such as rods or tapes, inserted and then be fitted directly to the vehicle seat.

The integral nature of the tubular portions also gives a neater appearance to the fabric piece and allows greater reproducibility of fit, appearance and quality in volume production, which is particularly important for the vehicle seat cover business. There is no sewing thread to match to the yarn of the fabric or to produce loose threads or ends which need to be removed. Integral knitting of the tubular portions also produces a strong firm structure which allows better fit and durability in use. The puckering which can occur with sewn attachments is easier to avoid because of the close control which the knitting process allows in positioning the tubular portions and in the yarn tensions employed during knitting.

The piece of upholstery fabric according to the invention is preferably knitted with its main portion in a mainly double jersey structure. It may be knitted on machines having independently operable needles disposed in at least two needle beds such as a flat V-bed knitting machine.

As mentioned, the tubular fabric portion may be integrally knitted in the form of a tubular hem at the margin of the piece. It may be formed as a tubular portion which is located between the front and rear faces of the fabric piece in the case of a mainly double jersey knitted structure. In this case, the front and rear faces of the mainly double jersey structure are locally separated in the knitting process into sections of single jersey fabric which together define a tubular fabric portion. This is described in more detail relative to FIG. 3 of the drawings. In another variation, it may be in the form of a tubular portion which projects from a surface of the fabric piece into which the base of the tubular fabric portion is integrally knitted. The latter two formations are suitable for the case where the tubular fabric portion is located at an intermediate location with respect to the margins of the upholstery fabric piece.

The axial length of a tubular portion may be chosen to suit the desired method of anchorage of the fabric piece to the support. For example, a relatively long tubular portion may be knitted where it is desired to anchor the fabric piece along the whole of a given length such as, for example, along the front edge of a vehicle seat using a rod threaded through the tube and located in a fixing under the seat.

In other cases, a comparatively short length of tubing may be sufficient so that it is like a loop of knitted fabric. Such loops may be hooked over individual fixings on the support or used in conjunction with other loops using rods, cords or tapes threaded through them to effect anchorage of the fabric piece to the support.

Whatever the form of a tubular portion its axis may be disposed parallel to, at right angles to, or at any desired inclination to, the wales of the fabric piece. When the tubular portion has its axis at right angles to the wales of the fabric piece, the knitted sequence of intermeshing loops referred to as comprising the tubular portion extends, from end to end of the sequence, in the wale direction from course to course, and continues at each end of said sequence as loops which intermesh with loops which comprise the main portion of the fabric piece, i.e. the knitting continues integrally in the wale direction from the tubular portion into the main portion of the fabric piece at each end of the knitted sequence of courses which comprises the tubular portion. When the tubular portion has its axis parallel to the wales of the fabric piece, the knitted sequence of intermeshing loops referred to as comprising the tubular portion extends, from end to end of the sequence, in the course direction from wale to wale, and continues at each end of said sequence as loops which intermesh with loops which comprise the main portion of the fabric piece, i.e. the knitting continues integrally in the course direction from the tubular portion into the main portion of the fabric piece at each end of the knitted sequence of wales which comprises the tubular portion.

When the tubular fabric portion has its axis inclined to the wales of the fabric piece, then the knitted sequence of intermeshing loops referred to as comprising the tubular portion may be characterized as extending, from end to end of the sequence, either in the wale direction from course to course or in the course direction from wale to wale because both conditions apply, i.e. the knitting continues integrally from the tubular portion into the main portion of the fabric piece at each end of the knitted sequence which comprises the tubular portion whether one takes that sequence to be from course to course in the wale direction or from wale to wale in the course direction.

In some cases, a tubular fabric portion may be inclined or at right angles to another tubular fabric portion and the two tubular fabric portions may meet at a junction. This may be required, for example, in a vehicle seat cover where a flexible rod is to be located in a tubular fabric portion running across the seat squab cover from one margin to the other margin for the purpose of holding the cover down in a depression in the seat squab. Where the tubular fabric portion running across the cover meets a tubular fabric portion at the margin of the cover, for example, then access to the said first tubular fabric portion needs to be provided so that, for example the flexible rod referred to can be inserted. Such access may take the form of a hole knitted in each wall of the marginal tubular portion at the junction of the two tubular portions.

The invention includes a method of machine knitting a piece of upholstery fabric, for covering at least part of the surface of a three-dimensional support including the step of integrally knitting one or more tubular fabric portions with a main portion of the upholstery fabric piece at location(s) where each such tubular portion can serve as an anchorage device for facilitating the securing of the upholstery fabric piece to said support.

The method according to the invention is particularly suitable for knitting fabric pieces having any known structure of mainly double jersey kind, for example any rib structure, or a two colour Jacquard structure with a bird's eye backing. With a mainly double jersey structure, the step of integrally knitting a tubular fabric portion may comprise locally knitting the front and rear faces of the fabric piece as sections of separated single jersey fabric which together define a tubular fabric portion. The step of integrally knitting a tubular fabric portion and the main portion of the upholstery fabric piece may be carried out, for preference, using yarn which is the same yarn for both main and tubular portions.

The method according to the invention may be carried out on a flat V-bed knitting machine. Such machines may have the capacity for shaping the fabric piece in the knitting process so that it will fit the part of the three-dimensional support which it is to cover.

The invention further includes, in a method of manufacturing a seat cover which is to be held in place by a retaining member, the step which comprises knitting the seat cover and in said knitting process forming a tubular element integrally with the knitted cover, for receiving the retaining member.

BRIEF DESCRIPTION OF THE DRAWINGS

The invention will now be described, by way of example, with reference to the accompanying drawings, in which.

DESCRIPTION OF PREFERRED EMBODIMENT

Figure 1:
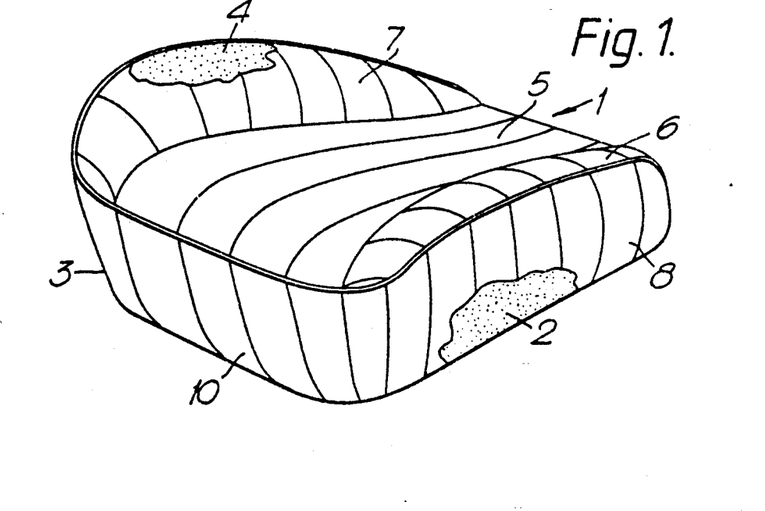
FIG. 1 is a perspective view of the base part of an automobile seat.

FIG. 1 shows a vehicle seat base, generally designated by the numeral 1, which comprises a cushion 2 covered with a fabric piece 3. The cushion 2 has bolster portions 4 adjacent to each of its sides, and the fabric piece 3 is tightly secured to metallic rods (not shown) recessed into the cushion 2. The fabric piece 3 comprises an upper surface portion 5, bolster-covering portions 6 and 7, side portions 8 and 9 (only one (8) of which can be seen in this Figure), a front portion 10 and a rear portion 11 (which is not visible in this Figure).

Figure 2:
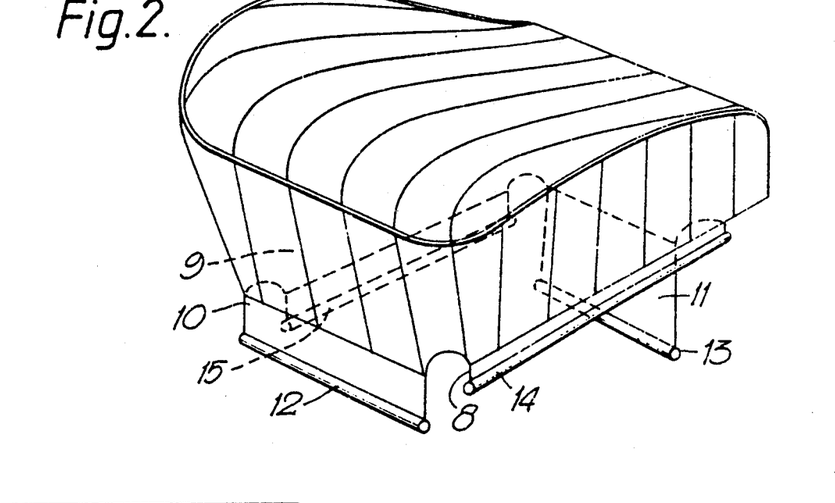
FIG. 2 is a view similar to FIG. 1 but showing the seat cover released from attachment to its cushion.

FIG. 2 shows the fabric piece 3 released from its attachment to the cushion 2. It will be seen that the front and rear portions 10 and 11 of the fabric piece 3 have tubular hems 12 and 13, respectively along their edges for attachment to two of the aforesaid metallic rods adjacent the front and rear of the undersurface of the cushion 2, and that the side portions 8 and 9 comprise tubular hems 14 and 15, respectively, along their edges for attachment to another two of said metallic rods which are disposed adjacent opposite sides of the undersurface of the cushion.

Figure 3:
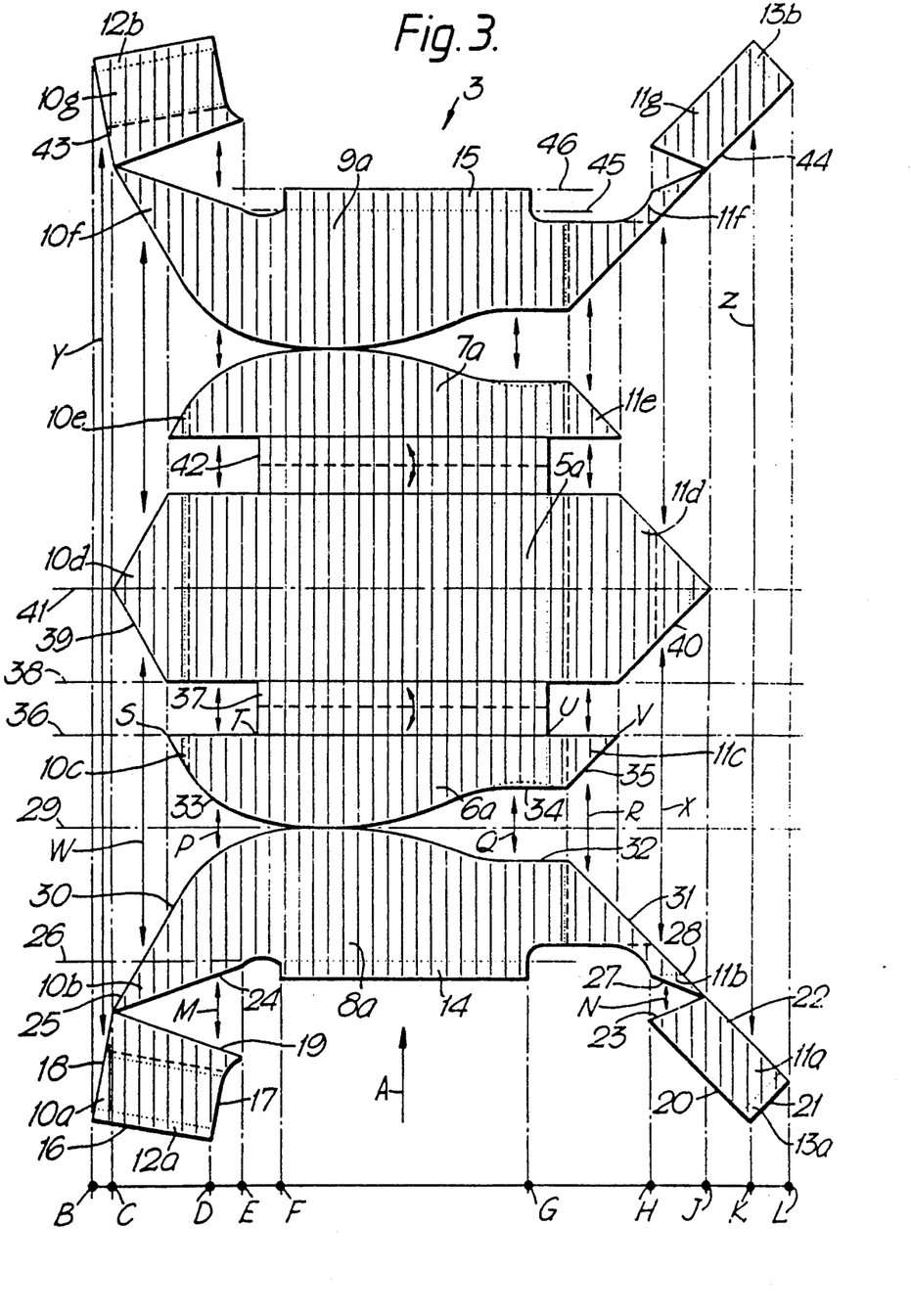
FIG. 3 is a schematic diagram illustrating a method of knitting the cover of the seat base of FIG. 1.

FIG. 3 is a diagram showing one way in which the fabric piece 3 of FIGS. 1 and 2 can be knitted as a one-piece fabric of mainly double jersey structure on a flat V-bed knitting machine provided with a conventional presser foot device and loop holding-down device for holding down the knitted fabric between the opposed needle beds of the machine. The direction of knitting, along the wales of the fabric, is indicated by the arrow A in FIG. 3. It is such that wales of the fabric piece 3 extend, as viewed in FIGS. 1 and 2, in the direction from the hem 14, up the side portion 8, across the bolster-covering portion 6, across the upper surface portion 5 from side to side of the latter, across the bolster-covering portion 7 and down the side portion 9 to the hem 15.

Referring to FIG. 3, the fabric areas 10a and 11a form parts of the front and rear portions 10 and 11, respectively, in FIG. 2, the fabric area 8a forms the side portion 8 in FIG. 2 and has end portions 10b and 11b which form further parts of the front and rear portions 10 and 11, respectively; the fabric area 6a forms the bolster-covering portion 6 in FIG. 2 and has end portions 10c and 11c which form further parts of the front and rear portions 10 and 11, respectively; the fabric area 5a forms the upper surface portion 5 in FIG. 2 and has end portions 10d and 11d which form further parts of the front and rear portions 10 and 11, respectively; the fabric area 7a forms the bolster-covering portion 7 in FIG. 2 and has end portions 10e and 11e which form further parts of the front and rear portions 10 and 11, respectively; the fabric area 9a forms the side portion 9 in FIG. 2 and has end portions 10f and 11f which form further parts of the front and rear portions 10 and 11, respectively; and the fabric areas 10g and 11g form the final parts of the front and rear portions 10 and 11, respectively.

In FIG. 3, the line BL represents a length of opposed needle beds of the machine on which the fabric piece 3 is knitted. Knitting begins on a few needles in the region of point D of the needle beds to commence formation of the fabric area 10a, more and more needles being brought progressively into action in the directions. from D to B and from D to E of the needle beds to define the edges 16 and 17. When all the needles from D to B have been brought into action, needles are progressively made inactive in the direction from B to C as further courses are knitted in the direction of arrow A, to define edge 18, each of the needles made inactive along BC retaining its last knitted loop. When all the needles from D to E have been brought into action, needles are progressively made inactive in the direction from E to C as further courses are knitted in the direction of arrow A, to define the edge 19, each of the needles made inactive along EC retaining its last knitted loop. This completes the knitting of the fabric area 10a, the portion 12a of which, adjacent to the edge 16, is knitted in the form of a tubular hem, in a manner described hereinafter. The tubular fabric portion 12a has an axis which is inclined to the wales of the fabric piece 3 which wales extend in the direction of arrow A as mentioned.

At the same time as the knitting of fabric area 10a is begun, knitting is also begun on a few needles in the region of point K on the needle beds to commence formation of the fabric area 11a. Knitting of this area is performed on needles in the needle bed length HL, in the same way as just described for the fabric area 10a, to define the edges 20-23 of the area 11a. The portion 13a of the area 11a, adjacent to the edge 21, is also knitted in the form of a tubular hem, in a manner described hereinafter.

When the areas 10a and 11a have been knitted, knitting of the fabric consisting of areas 10b, 8a and 11b is commenced on needles at points C and J of the needle beds. During knitting of the area 10b and part of area 8a, needles previously made inactive between points C and E are progressively re-activated to join edge 19 to edge 24, as indicated schematically by the arrow M. At the same time, other needles are made progressively inactive in the direction from C towards E to define edge 25, each of these last mentioned needles retaining its last knitted loop. When the course designated 26 has been reached, knitting on needles between points C and E is stopped and knitting is commenced on needles between points F and G to begin the edge portion 14 of fabric area 8a up to course 26. The edge portion 14 is knitted as tubular fabric, in a manner described hereinafter.

Tubular fabric portion 14 has an axis which is at right angles to the wales of the fabric piece 3. At the same time as the knitting of the area 10b and the left-hand portion of the area 8a are being performed, the fabric area 11b and the right-hand portion of the area 8a are knitted, up to the course 26, in the same way as just described for the area 10a and the left-hand portion of the area 8a. During this stage of the knitting, the edge 23 becomes joined to edge 27, as indicated schematically by the arrow N and an edge 28 is defined along area 11b.

When the fabric has been knitted up to course 26 in all these areas, knitting of the central portion of the area 8a is completed up to course 29, the needles being made progressively inactive, and retaining their last knitted loops, to define edges 30, 31 and 32.

Knitting of the area comprising portions 6a, 10c and 11c is then commenced, with the progressive reactivation of needles previously rendered inactive to define the edges 33, 34 and 35. During this stage of the knitting the right-hand part of the edge 30 becomes joined to the edge 33, as indicated schematically by the arrow P, edge 32 becomes joined to the edge 34, as indicated schematically by the arrow Q, and the left-hand part of edge 31 becomes joined to the edge 35, as indicated schematically by the arrow R. When the area comprising portions 6a, 10c and 11c has been knitted up to the course 36, knitting is stopped on needles between points S and T and between points U and V of course 36, each of the needles made inactive retaining its last knitted loop. Knitting is continued on selected needles between points T and U to knit the fabric area 37 up to the course 38. At this course 38, the needles previously made inactive at course 36 are all brought back into action and the knitting of the fabric area comprising portions 5a, 10d and 11d is commenced. During this stage of the knitting, needles previously made inactive during knitting of the edge 25 of the area 10b and the edge 28 of the area 11b are brought back into action progressively to define edges 39 and 40. In the performance of this stage of the knitting, the edge 39 becomes joined to the edge 25 and the left-hand part of the edge 30, as indicated schematically by the arrow W, and the edge 40 becomes joined to the right-hand part of the edge 31 and the edge 28, as indicated schematically by the arrow X. The edges 39 and 40 are completed when knitting reaches the course 41.

Course 41 represents the transverse centre-line of the fabric piece 3 and knitting of the remainder of the piece 3 from the course 41 onwards is performed by a procedure which is substantially the reverse of the procedure outlined above for knitting up to the course 41. During this stage of the knitting, a fabric area 42, similar to the area 37, is knitted between the fabric areas 5a and 7a and a tubular hem 15, similar to the hem 14, is knitted on the area 9a. As with hem 14, the axis of the tubular fabric portion comprising hem 15 is at right angles to the wales of the fabric piece 3.

In the knitting of the final fabric areas 10g and 11g, the needles made inactive along BC and JL during knitting of the areas 10a and 11a are brought back into action progressively to join the edge 18 of the area 10a to the edge 43 of the area 10g, as indicated schematically by the arrow Y, and to join the edge 22 of the area 11a to the edge 44 of the area 11g, as indicated schematically by the arrow Z. During this procedure, the fabric areas 10a and 10g become joined to form part of the front portion 10 (see FIG. 2) with the portions 12a and 12b joined end-to-end to form the tubular hem 12. At the same time, the fabric areas 11a and 11g become joined to form part of the rear portion 11 (see FIG. 2) with the portions 13a and 13b joined end-to-end to form the tubular hem 13.

All areas of the fabric piece 3, apart from the tubular hems 12a, 12b, 13a, 13b, 14 and 15 and the areas 37 and 42 are knitted with a mainly double jersey structure on both beds of the knitting machine.

The hem 15 in FIG. 3 extends between courses 45 and 46. At course 45 the knitting of double jersey structure stops and the knitting of two pieces of single jersey fabric, one on each bed of the machine, continues up to a course situated two courses before the course 46. Double jersey knitting is then resumed on both needle beds for two courses, up to course 46. The result of this is to give the hem 15 a tubular construction. On completion of the course 46, the hem 15 may be cast off the needles and the edge of double jersey fabric sewn to prevent unravelling. Alternatively, one or two courses of a fusible yarn may be knitted at the edge of hem 15 after completion of course 46. Subsequent fusion of this fusible yarn prevents unravelling of the two double jersey courses at and adjacent to course 46.

Procedures similar to that just described may be used for knitting the tubular hems 12b and 13b, but since the axes of the tubular fabric portions comprising these hems are inclined to the wale directions of the fabric areas concerned, steps must be taken, as knitting proceeds, progressively to reduce the number of needles employed to knit double jersey structure with a corresponding progressive increase in the number of needles employed to knit the two single jersey fabrics.

The tubular hems 12a, 13a and 14 may be knitted using procedures which are substantially the reverse of the procedures described above for knitting the tubular hems 12b, 13b and 15. Thus, for example, the hem 14 is commenced with a double jersey set-up on the two needle beds, which is followed by separate single jersey courses up to course 26. It will, of course, be appreciated that there is no need to take precautions to prevent unravelling of the initial double jersey structure of the hems 12a, 13a and 14.

Figure 4:
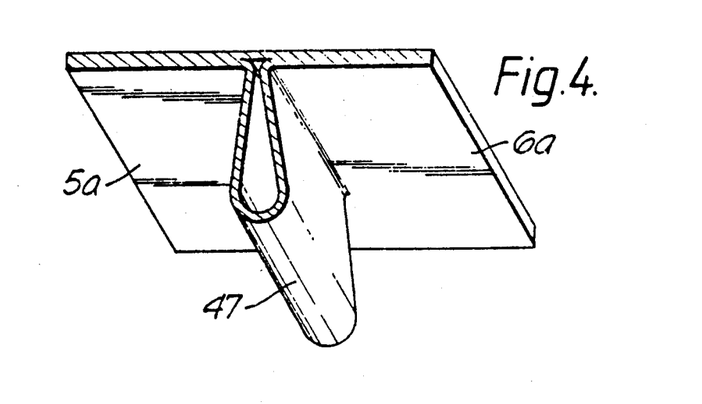
FIG. 4 is a perspective view, on an enlarged scale, of a portion of the cover knitted in the manner illustrated in FIG. 3.

In the above described knitting of the fabric piece 3, it will be appreciated that the knitting of the course 38 has the effect of joining the fabric areas 5a and 6a and forming the fabric area 37 into a loop projecting from the undersurface of the fabric piece 3. Likewise, the fabric area 42 forms another loop projecting from the undersurface of the fabric piece 3. FIG. 4 is a schematic perspective view showing one of these loops, designated 47 projecting from the fabric areas 5a and 6a, with its base knitted integrally into each of these areas. Instead of providing these loops on the undersurface of the fabric 3, tubes may be knitted into the fabric by knitting single jersey fabrics on both needle beds of the machine from course 36 to course 38.

Figure 5:
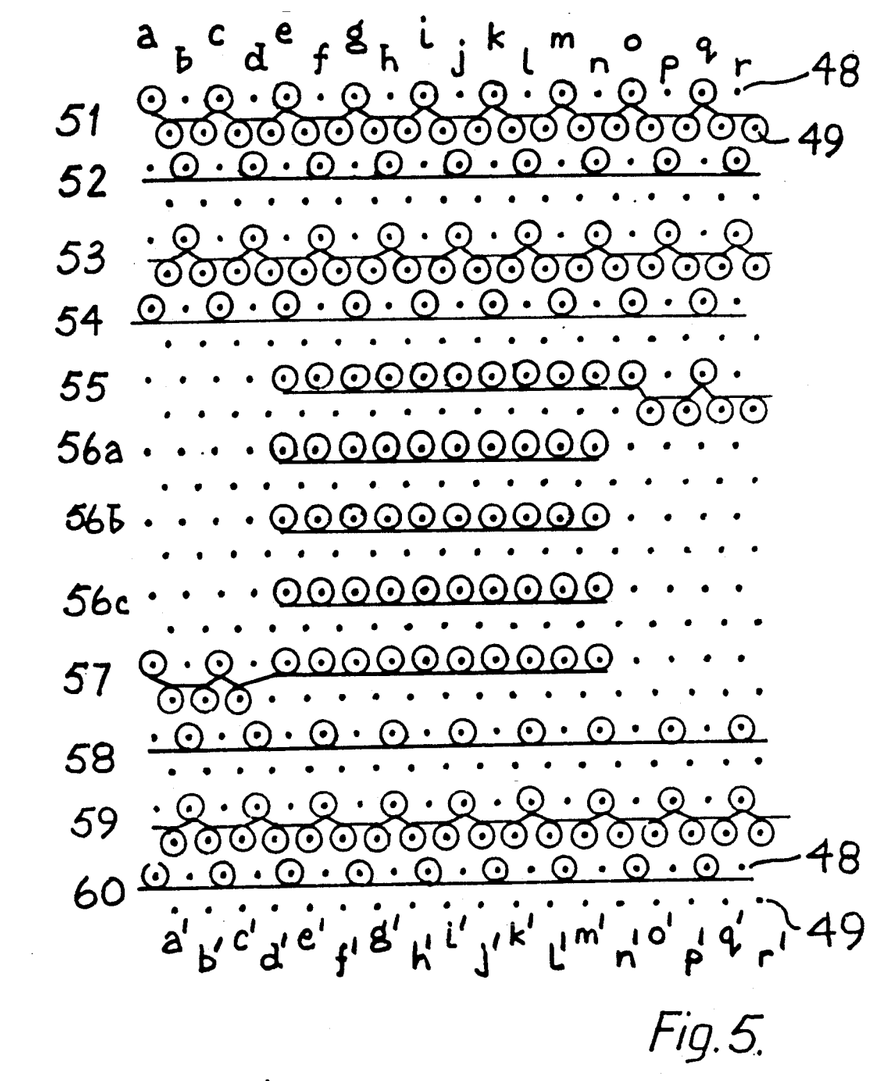
FIG. 5 is a knitting loop diagram showing the knitting construction of a portion of the cover illustrated in FIG. 3 which is a slightly wider portion than that shown in perspective in FIG. 4.

FIG. 5 shows the knitting loop diagram for successive courses of the portion of cover fabric referred to, i.e. that including loop 47 as shown in FIG. 4. The fabric was knitted on the needles of opposed needle beds of a flat V-bed knitting machine, the needles shown at 48 being in the rear needle bed and the needles shown at 49 being in the front needle bed.

Ten courses are shown marked 51 to 60 and the eighteen needle positions in each bed are marked a to r in the rear bed and a' to r' in the front bed.

The main portion of cover fabric which is shown as 5a and 6a in FIG. 4 is represented by courses 51 to 54 and 58 to 60 and comprises a Jacquard double jersey construction with a bird's eye backing. The projecting loop of fabric 47 shown in FIG. 4 is represented by courses 56a, 56b and 56c which are shown only as three courses for convenience but are necessarily an odd number of multiple repeat courses, for example nineteen in all, to give the desired height of loop 47. Courses 55 and 57 are connecting courses between the fabric areas 5a and 6a and the loop 47.

In a single system weft knitting operation, knitting proceeds from right to left along course 51, from left to right along course 52 and so on. In course 55, knitting from right to left, at needle positions r to o and r' to o' the same construction is knitted as was knitted at the same needle positions in course 51. Knitting then continues only on the rear bed at needle positions n to e, followed by an odd number of multiple repeat courses (56) over needle positions e to n and n to e on the rear bed only to form the single jersey fabric of the loop 47. Connecting course 57 is then knitted right to left on the rear bed only at needle positions n to e and then on both beds for the remainder of the course. Jacquard double jersey knitting is resumed in courses 58, 59 and 60.

The fabric 5a and 6a (FIG. 4) is joined on both sides of the loop 47 as continuing double jersey knitting.

On the rear bed, the fabric of the loop 47 represented by courses 56 is integrally knitted to fabric areas 5a and 6a by means of intermeshing knitted loops between courses 55 to 56 and 56 to 57 at needle positions e to n. On the front bed, knitting continues from course 53 to course 59 at all front bed needle positions with immediate loops being formed at needle positions o', p', q' and r' on course 55 and at needle positions a', b' and c' on course 57. By this imbalanced structure, the fabric produced has a plain face with a localised fabric loop 47 of tubular configuration projecting from its reverse face.

Figure 6:
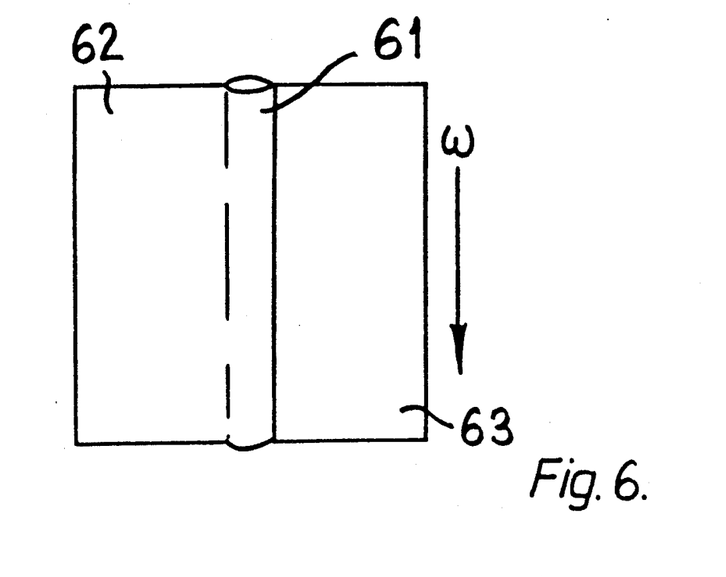
FIG. 6 is a schematic diagram of a section of knitted upholstery fabric having an integral tubular portion with its axis parallel to the fabric wales.
Figure 7:
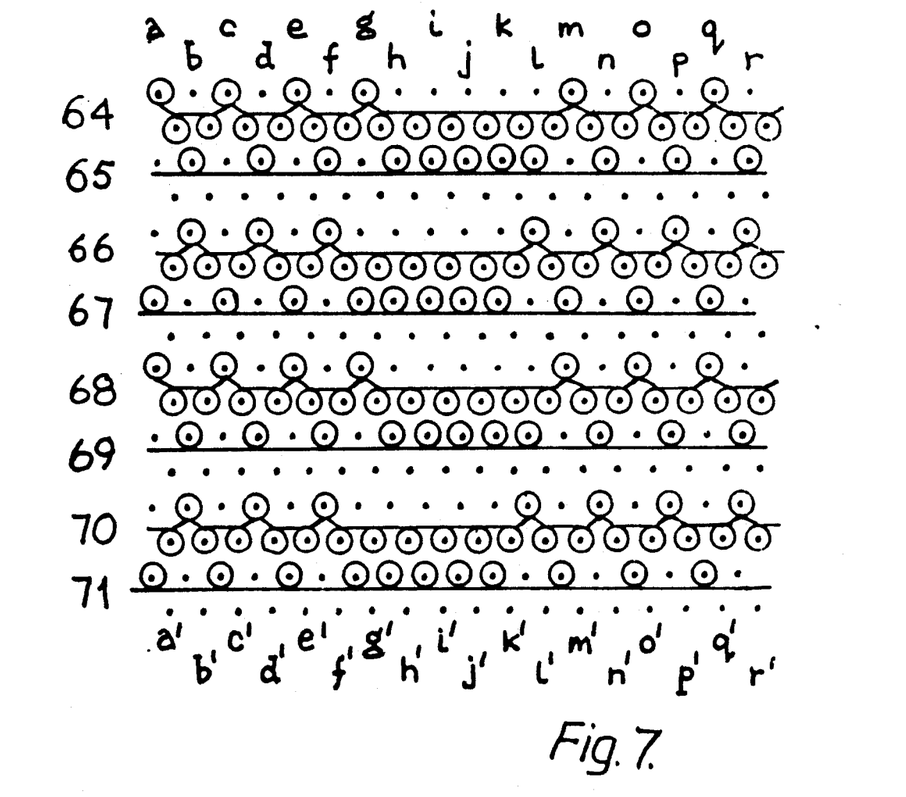
FIG. 7 is a knitting loop diagram showing the knitting construction of the fabric illustrated in FIG. 6.

The fabric illustrated in FIGS. 6 and 7 is a double jersey fabric with an integral tubular portion 61 with its axis parallel to the wales of the fabric as indicated by arrow W.

The sections of fabric 62 and 63 on either side of the tubular portion 61 is of a double jersey Jacquard construction with a bird's eye backing. The fabric of the tubular portion 61 is two layers each of single jersey construction.

The fabric is knitted in a four course repeat, courses 68 to 71 being a repeat of courses 64 to 67. In the center wales, generally between needle positions g' and k', single jersey knitting is carried out on the respective rear and front needle beds as indicated to produce the tubular portion 61. This is integral with the sections of double jersey fabric 62 and 63 at each side as shown.

Referring back to FIG. 3, when the knitting of the fabric piece 3 has been completed, it has the appearance of the seat base cover shown in FIG. 2. To fit the cover to the cushion 2 (FIG. 2), the loops 47 (FIG. 4) are slipped over metallic rods (not shown) recessed into the cushion where the bolsters 4 join the main seat part of the cushion. Then metallic rods are slipped into the tubular hems 12-15 and the rods are secured to the underside of the cushion.

Of course, the finished cover may be secured to its cushion without the employment of metallic rods in the manner just described. For example, a draw-cord may be threaded through the tubular hems 12-15 so that subsequent tightening of the cord draws the hems under the cushion. Again, if there is to be no provision enabling removal of the cover from its cushion, the cover may be secured to the cushion by a heat-shrinkable tape threaded through the tubular hems 12-15.

The invention is not, of course, limited to the knitting of the particular seat base cover shown in FIGS. 1 and 2. It is equally applicable to the knitting of seat back covers and to covers for seat bases of a different shape from that shown in FIG. 1.

What is claimed is:

1. A piece of machine-knitted upholstery fabric for covering at least part of a surface of a three-dimensional support which comprises a main portion comprising a knitted sequence of intermeshed loops of yarn and one or more tubular fabric portions integral with the main portion at location(s) where each such tubular fabric portion can serve as an anchorage device for facilitating the securing of the upholstery fabric piece to said support, each such tubular fabric portion comprising a knitted sequence of intermeshed loops of yarn of which loops of yarn at each end of said sequence intermesh with loops of yarn comprising the main portion whereby the main and tubular portion comprise an integral knitted structure.

2. A piece of machine-knitted upholstery fabric as claimed in claim 1 comprising a mainly double jersey knitted structure.

3. A piece of machine-knitted upholstery fabric as claimed in claim 2 in which a tubular fabric portion is located between front and rear faces of the fabric piece.

4. A piece of machine-knitted upholstery fabric as claimed in claim 2 in which a tubular fabric portion having a base projects from a face of the fabric piece into which the base of the tubular fabric portion is integrally knitted.

5. A piece of machine-knitted upholstery fabric as claimed in claim 4 in which said tubular fabric portion is in the form of at least one loop of knitted fabric.

6. A piece of machine-knitted upholstery fabric as claimed in claim 1 in which a tubular fabric portion and the main portion both comprise the same yarn.

7. A piece of machine-knitted upholstery fabric as claimed in claim 1 in which a tubular fabric portion is located at or close to a margin of the fabric piece.

8. A piece of machine-knitted upholstery fabric as claimed in claim 1 in which a tubular fabric portion is located with its axis at right angles to wales of the main portion of the knitted fabric piece.

9. A piece of machine-knitted upholstery fabric as claimed in claim 1 in which a tubular fabric portion is located with its axis parallel to wales of the main portion of the knitted fabric piece.

10. A piece of machine-knitted upholstery fabric as claimed in claim 1 in which a tubular fabric portion is located with its axis inclined to wales of the main portion of the knitted fabric piece.

11. A piece of machine-knitted upholstery fabric as claimed in claim 1 which is shaped to fit a part of the three-dimensional support which it is to cover.

12. A piece of machine-knitted upholstery fabric for covering at least part of a surface of a three-dimensional support which comprises a main portion comprising a knitted sequence of intermeshed loops of yarn and which has one or more tubular fabric portions integral with the main portion at location(s) where each such tubular fabric portion can serve as an anchorage device for facilitating the securing of the upholstery fabric piece to said support, each such tubular fabric portion comprising a knitted sequence of intermeshed loops of yarn of which loops of yarn at each end of said sequence intermesh with loops of yarn comprising the main portion whereby the main and tubular portions comprise an integral knitted structure and wherein the upholstery fabric piece has front and rear faces which are joined in a mainly double jersey knitted structure in the main portion and which are locally separated into sections of single jersey fabric together defining a tubular fabric portion.

13. A piece of machine knitted upholstery fabric for covering at least part of a surface of a three-dimensional support which comprises a knitted sequence of intermeshed loops of yarn and which has one or more tubular fabric portions integral therewith at location(s) where each such tubular fabric portion can serve as an anchorage device for facilitating the securing of the upholstery fabric piece to said support, each such tubular fabric portion comprising a knitted sequence of intermeshed loops of yarn of which loops of yarn at each end of said sequence intermesh with loops of yarn comprising the main portion whereby the main and tubular portions comprise an integral knitted structure and wherein said intermeshing loops from respectively the main portion and each end of the knitted sequence of intermeshed loops which comprise a tubular fabric portion are comprised of the same yarn.

14. An upholstery cover for a seat base or seat back of a vehicle seat which comprises a piece of machine knitted upholstery fabric comprising a main portion comprising a knitted sequence of intermeshed loops of yarn and one or more tubular fabric portions integral therewith at location(s) where each such tubular fabric portion can serve as an anchorage device for facilitating the securing of the upholstery cover to said vehicle seat base or seat back, each such tubular fabric portion comprising a knitted sequence of intermeshed loops of yarn of which loops of yarn at each end of said sequence intermesh with loops of yarn comprising the main portion whereby the main and tubular portions comprise an integral knitted structure.

* * * * *